(12) United States Patent
Xie

(10) Patent No.: US 7,637,607 B2
(45) Date of Patent: Dec. 29, 2009

(54) SHELTER FRAME FOR SPECTACLES

(76) Inventor: Yiling Xie, 900 Arcadia Ave., #8, Arcadia, CA (US) 91007

( * ) Notice: Subject to any disclaimer, the term of this patent is extended or adjusted under 35 U.S.C. 154(b) by 0 days.

(21) Appl. No.: 12/075,712

(22) Filed: Mar. 12, 2008

(65) Prior Publication Data

US 2009/0231538 A1    Sep. 17, 2009

(51) Int. Cl.
*G02C 7/08* (2006.01)
(52) U.S. Cl. .................. 351/58; 351/48; 351/128
(58) Field of Classification Search .......... 351/41, 351/47, 48, 57, 58, 124, 125, 128, 126, 127, 351/129–135
See application file for complete search history.

(56) References Cited

U.S. PATENT DOCUMENTS 6,302,538 B1 * 10/2001 Friedman .................. 351/48

2005/0206838 A1 * 9/2005 Chow .................. 351/124

* cited by examiner

*Primary Examiner*—Huy K Mai
(74) *Attorney, Agent, or Firm*—Raymond Y. Chan; David and Raymond Patent Firm

(57) ABSTRACT

A shelter frame includes two shelter lenses, two lens holders provided at two outer sides of the shelter lenses respectively, and a retractable arm extended between two inner sides of the shelter for applying a retractable force therebetween to adjust the control distance. When the shelter lenses are pulled away from each other to lengthen the retractable arm for extending the control distance, the lens holders are adapted for engaging with two outer sides of the lenses of the primary frame, such that when the retractable arm is retracted via the retractable force, the shelter lenses are adapted for holding in front of the lenses respectively so as to detachably couple the shelter frame in front of the primary frame.

7 Claims, 14 Drawing Sheets

SHELTER FRAME FOR SPECTACLES

BACKGROUND OF THE PRESENT INVENTION

1. Field of Invention

The present invention relates to spectacles frame, and more particularly to a shelter frame, wherein a retractable arm of the shelter frame is adapted for applying a retraction force between two shelter lenses to securely engage two lens holders at two outer sides of the lenses of the primary frame respectively so as to stably mount the shelter lenses in front of the lenses respectively.

2. Description of Related Arts

Nowadays, wearing eyeglasses is not only for people to see clearer, but also has become a symbol of personal style. Except for fashion eyeglasses, the consumer puts more emphasis on their function whether or not the eyeglasses are convenient and comfortable for the consumer to wear. Because of greater diversity and choice, the shelter frames have become more and more popular in our daily lives. People usually can choose different looks, and colors of their individual frames to match their outfits and destinations. Therefore, the wearer does not need to carry a pair of eyeglasses and a pair of sunglasses. However, most of the sunglasses clipping claws are made of metal; it may scratch the lenses of the primary eyeglasses when clipping on. Also, the wearer must use both hands to align and engage the conventional clip-on sunglasses on the primary eyeglasses in correct position. It is troublesome and dangerous for a wearer to use both hands to wear such clip-on sunglasses on the regular glasses while he or she is driving.

In order to solve the problem of the above mentioned clip-on sunglasses, the magnetic attachment has been recently introduced to the eyeglasses industry. A primary pair of magnet members is affixed on two side extensions of a primary spectacle frame. However, the users have to align two pairs of magnet members. If the auxiliary magnet members of the sunglasses are misaligned with the primary magnet, the primary spectacle frame will fall down from the primary spectacle frame easily. In the other hand, the major drawback of the eyeglasses equipped with the magnet attachment is that the primary spectacle frame needs to be altered its original structural design in order to affix the magnet members thereon. So, the wearer may have to buy a pair of spectacle frames including a primary eyeglasses and an auxiliary sunglasses, which is much expensive than that the wearer needs to buy the clip-on sunglasses only Moreover, some of the convenient spectacle frame provides the attachment clipped closing by pushing together the center nosepiece. However, the assembling area of the spectacle frame is too small. It is obvious that it is not easy for people to assemble the shelter frame for the spectacle. To sum up, it obviously can not achieve the current needs based on the existing photo album.

SUMMARY OF THE PRESENT INVENTION

A main object of the present invention is to provide a shelter frame for spectacles, wherein a retractable arm of the shelter frame is adapted for applying a retraction force between two shelter lenses to securely engage two lens holders at two outer sides of the lenses of the primary frame respectively so as to stably mount the shelter lenses in front of the lenses respectively.

Another object of the present invention is to provide a shelter frame for spectacles, wherein the shelter frame is adapted to be mounted on any kind of the primary spectacle frame without any alternation of the primary spectacle frame.

Another object of the present invention is to provide a shelter frame for spectacles, which does not require changing of the original structural design of the primary spectacle frame, so as to minimize the purchasing cost for the users.

Another object of the present invention is to provide a shelter frame for spectacles, wherein the lens holders are engaged with two outer sides of the lenses of the primary frame to maximize a holding length of the shelter frame with respect to the primary frame. In other words, the shelter frame is securely held by using the width of the primary frame to retain the shelter frame in a stably manner.

Another object of the present invention is to provide a shelter frame for spectacles, wherein each of the lens holders is made of plastic materials adapted for biasing against the outer edges or the rear surfaces of the lenses in such a manner that the lens holders are non-destructive to the lenses. As such, the lenses will be kept intact while the shelter frame is detachably mounted on the primary spectacles frame for shading sunlight.

Another object of the present invention is to provide a shelter frame for spectacles, wherein the shelter frame is strong in construction so as to prevent up and down movement or sideward movement of the shelter frame with respect to the primary spectacle frame.

Another object of the present invention is to provide a shelter frame for spectacles, wherein the wearer may merely use one hand to attach or detach the shelter frame during exercising or driving.

Accordingly, in order to accomplish the above objects, the present invention provides a shelter frame for mounting in front of a primary spectacles frame which comprises a frame body mounting two lenses in position, wherein the shelter frame comprises two shelter lenses and two lens holders provided at two outer sides of the shelter lenses respectively. The shelter frame further comprises a retractable arm extended between two inner sides of the shelter for applying a retractable force therebetween to adjust the control distance, wherein when the shelter lenses are pulled away from each other to lengthen the retractable arm for extending the control distance, the lens holders are adapted for engaging with two outer sides of the lenses of the primary frame, such that when the retractable arm is retracted via the retractable force, the shelter lenses are adapted for holding in front of the lenses respectively.

These and other objectives, features, and advantages of the present invention will become apparent from the following detailed description, the accompanying drawings, and the appended claims.

DETAILED DESCRIPTION OF THE PREFERRED EMBODIMENT

Figure 1:
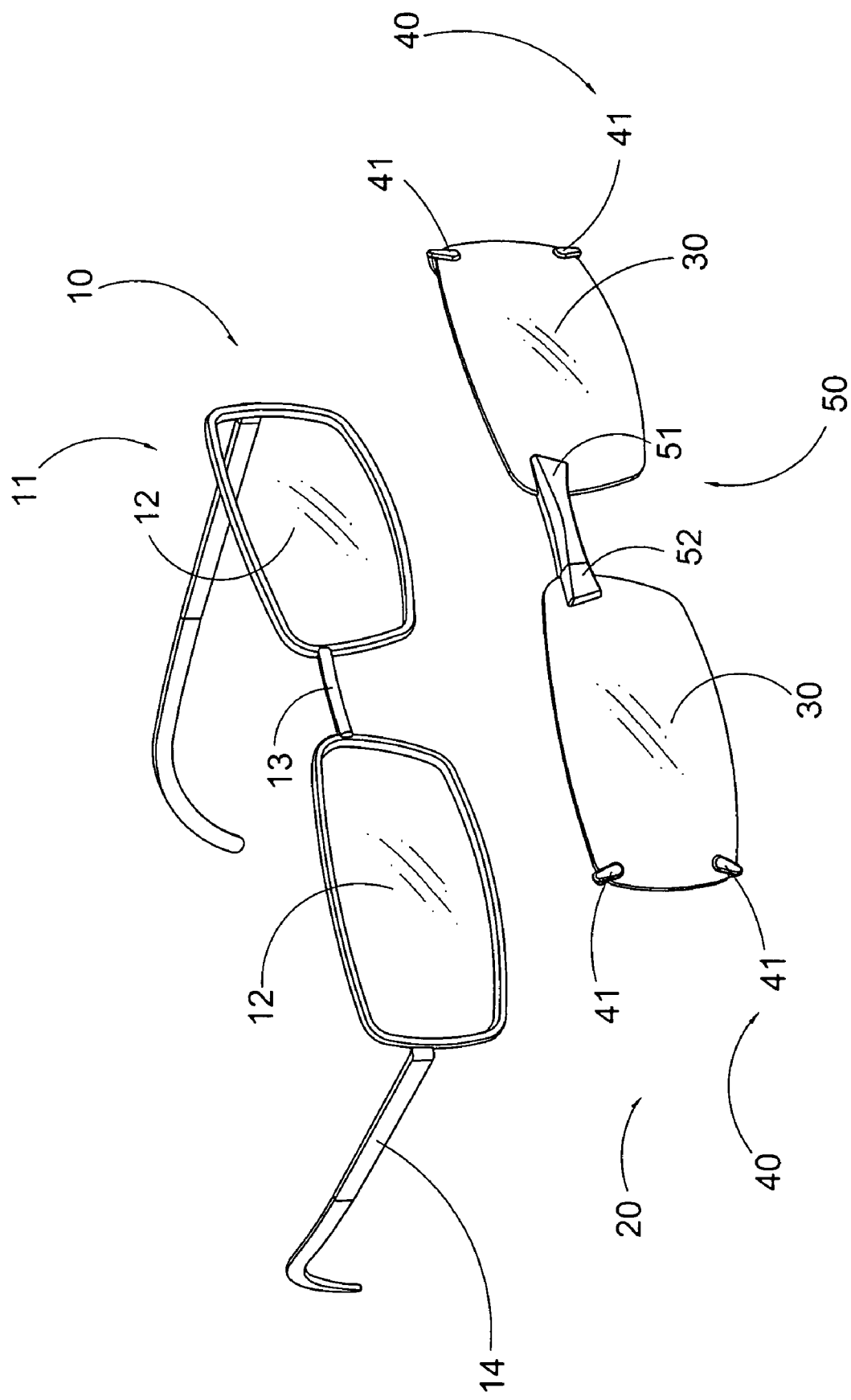
FIG. 1 is a perspective view of a shelter frame for a primary frame according to a preferred embodiment of the present invention.

Referring to FIG. 1 of the drawing, a shelter frame 20 according to a preferred embodiment of the present invention is illustrated, wherein the shelter frame 20 is adapted for mounting in front of a primary frame 10.

The primary frame 10 comprises a frame body 11 mounting two lenses 12 in position, a bridge 13 extending between two inner sides of the lenses 12, and two side extensions 14 extending from two outer sides of the lenses 12. According to the preferred embodiment, the shelter frame 20 comprises two shelter lenses 30, two lens holders 40 provided at two outer sides of the shelter lenses 30 respectively, and a retractable arm 50 extended between the shelter lenses 30.

The two spaced apart shelter lenses 30 define a control distance between two inner sides of the shelter lenses 30. The retractable arm 50 is extended between two inner sides of the shelter lenses 30 for applying a retractable force therebetween to adjust the control distance, wherein when the shelter lenses 30 are pulled away from each other to lengthen the retractable arm 50 for extending the control distance, the lens holders 40 are adapted for engaging with two outer sides of the lenses 12 of the primary frame 10, such that when the retractable arm 50 is retracted via the retractable force, the shelter lenses 30 are adapted for holding in front of the lenses 12 respectively.

Practically, the primary frame 10 can be constructed as a conventional spectacles frame to have a pair of lens rims as shown in FIG. 1 of the drawings, or a rimless frame that the primary bridge 13 and the two side extensions 14 are directly fastened to the edges of the two lenses 12. In other words, the primary frame 10 does not require modifying its original structure for mounting the shelter frame 20 thereon. So, the shelter frame 20 of the present invention fits for all kinds of conventional primary spectacles frame. In other words, the user does not need to buy a set of expensive primary spectacle frame and corresponding shelter frame. The user can merely additionally purchase the shelter frame 20 of the present invention to fit his or her current spectacle frame that he or she has originally.

According to the first preferred embodiment, as shown in FIG. 1 to FIG. 4 of the drawings, the retractable arm 50 comprises a first member 51 mounted to the inner side of one of the shelter lenses 30, a second member 52 mounted to the inner side of another shelter lens 30, and a retraction unit 53 coupling between the first and second members 51, 52 such that the shelter lenses 30 are adapted to be pulled away from each other to extend the control distance.

Figure 6:
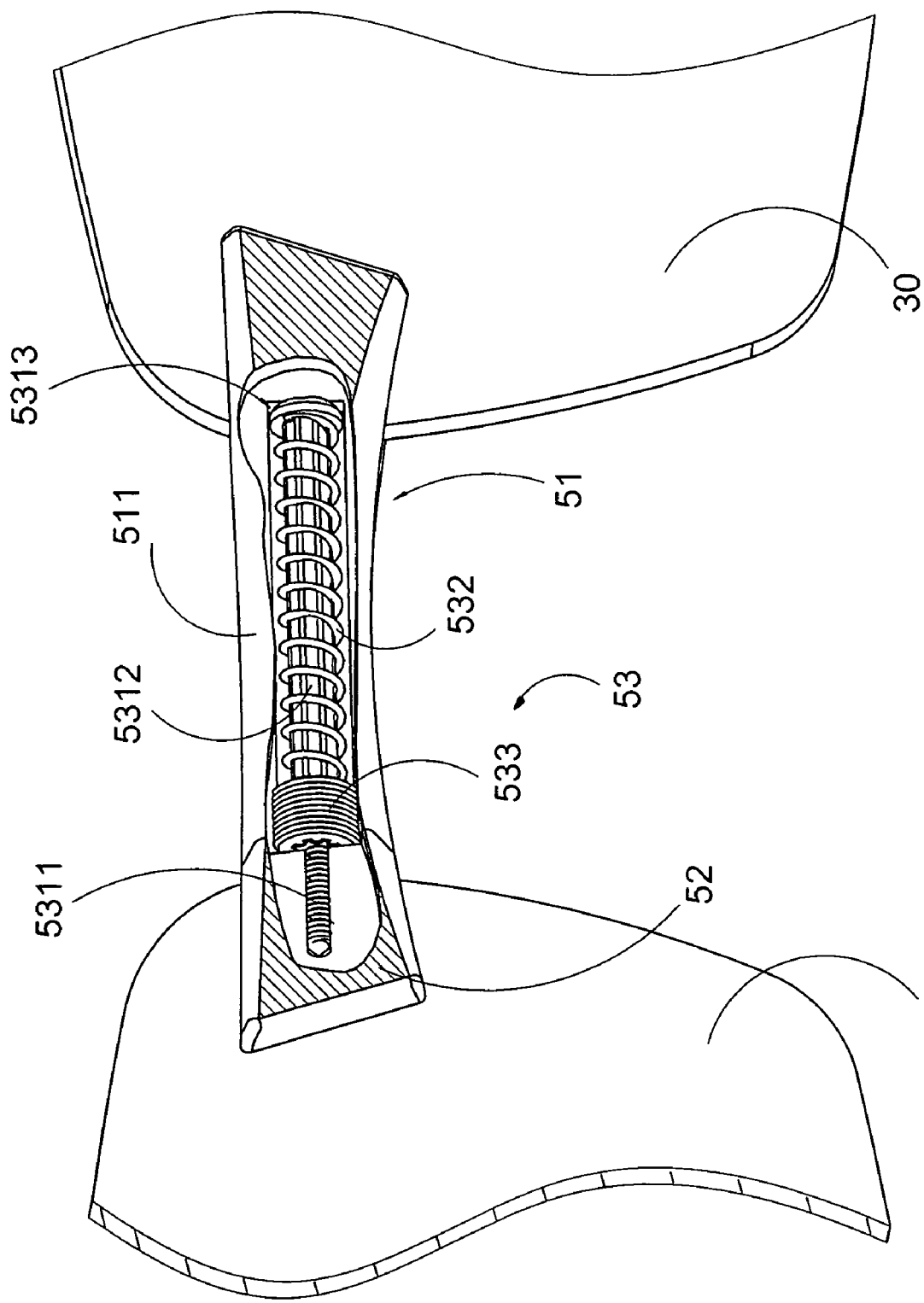
FIG. 6 is a sectional view of the retractable arm of the shelter frame according to the above preferred embodiment of the present invention.
Figure 7:
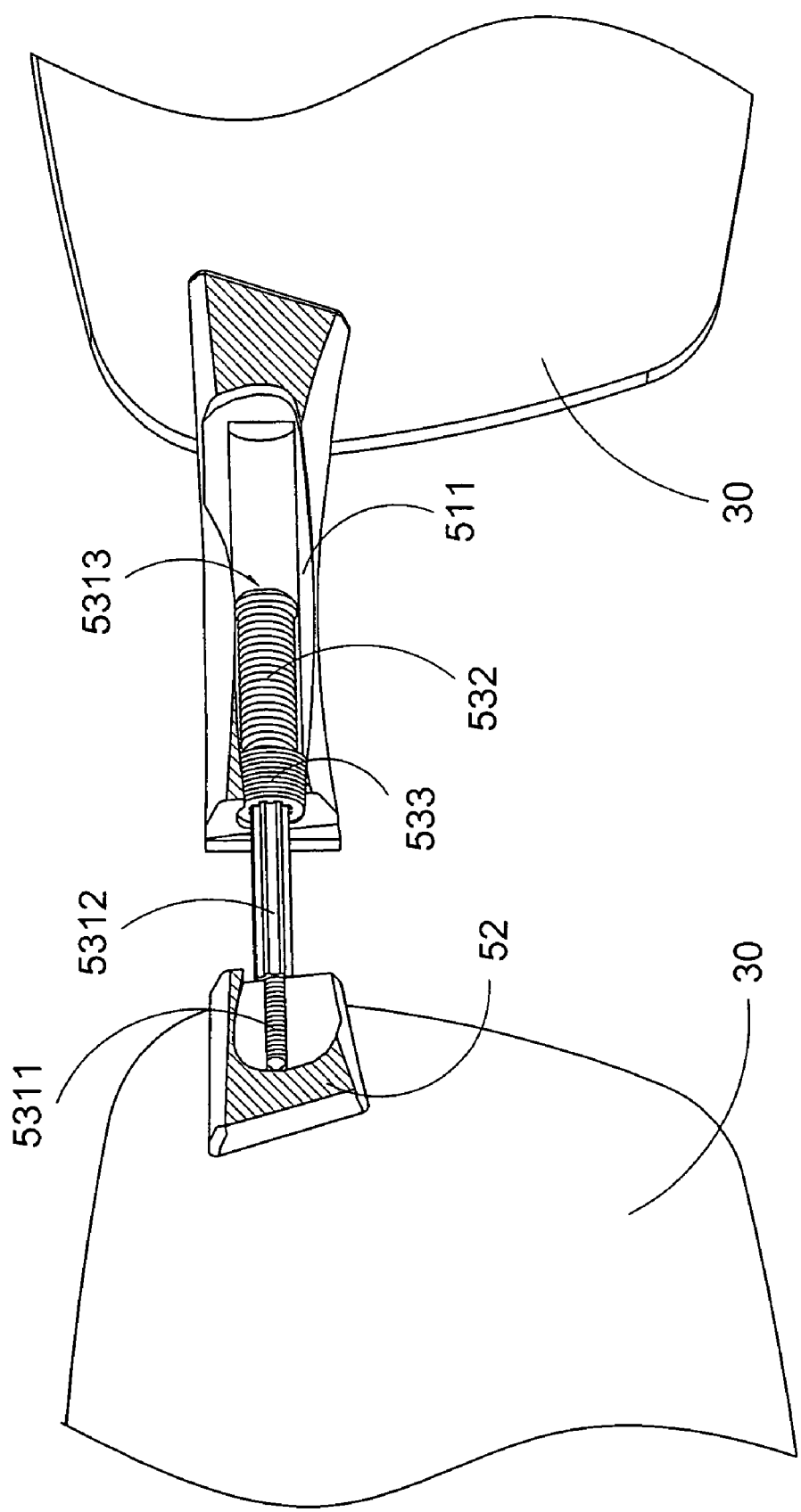
FIG. 7 is a sectional view of the retractable arm of the shelter frame according to the above preferred embodiment of the present invention, illustrating the control distance of the shelter frame being increased.
Figure 8:
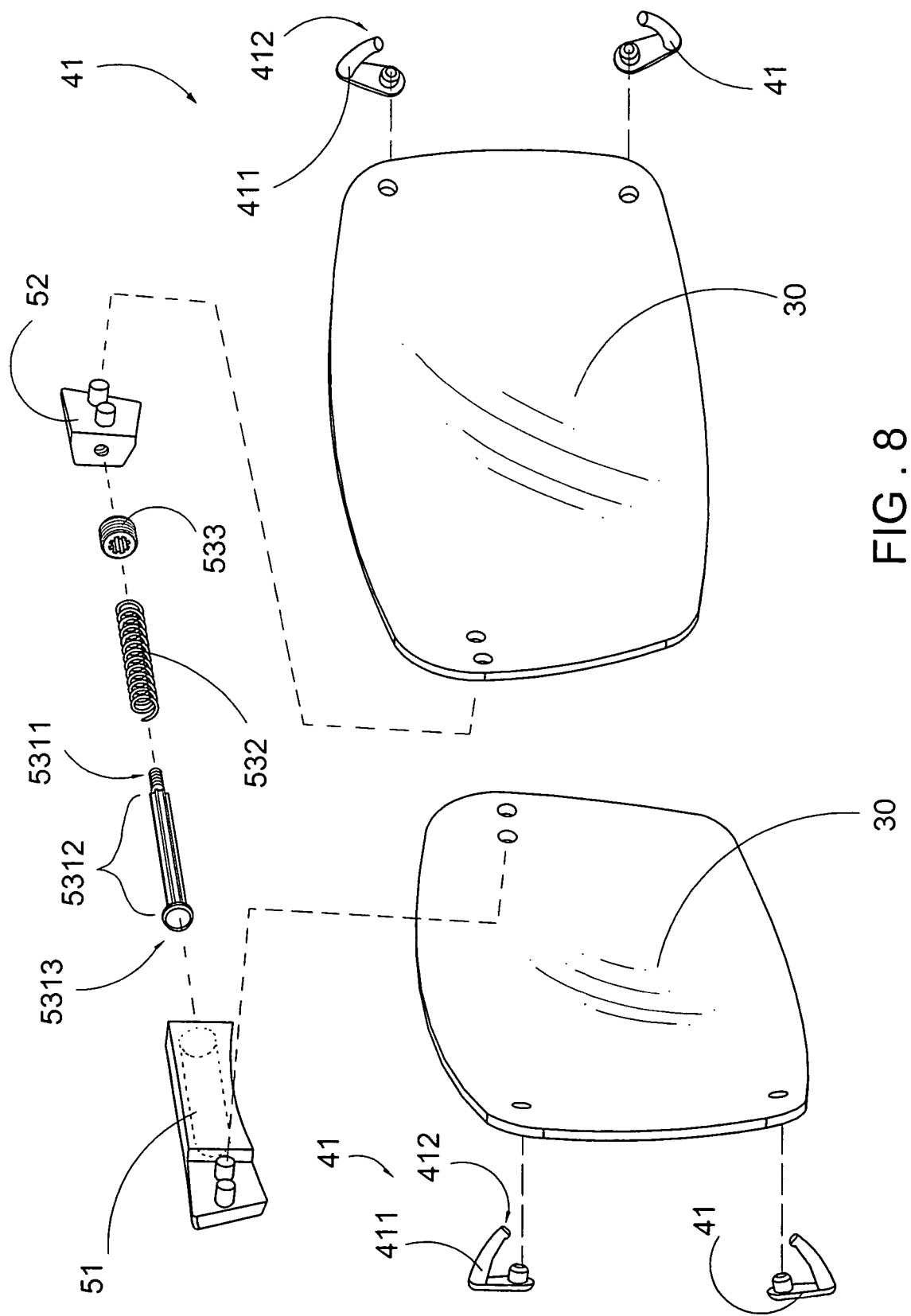
FIG. 8 is an exploded perspective view of the shelter frame according to the above preferred embodiment of the present invention.

According to the preferred embodiment as shown in FIGS. 6 to 8 of the drawings, the retraction unit 53 comprises an elongated control arm 531 having an affixing end portion 5311 affixed to the second member 52 and a sliding end portion 5312 slidably coupled with the first member 51, and a resilient element 532 coupling with the sliding end portion 5312 of the control arm 531 for applying the retractable force against the first member 51 to pull the first member 51 towards the second member 52.

Accordingly, the first member 51 comprises a tubular sleeve 511 having a closed end mounting to the inner side of the respective shelter lens 30 and an opened end extended towards the inner side of another shelter lens 30, wherein the sliding end portion 5312 of the control arm 531 is slidably received in the tubular sleeve 511 to slidably engage the second member 52 with the first member 51.

According to the preferred embodiment, the resilient element 532 comprises a compression spring coaxially mounted at the sliding end portion 5312 of the control arm 531 for applying the retractable force against the second member 52 when the second member 52 is pulled away from the first member 51. In the other hand, the retraction unit 53 further comprises a retaining stopper 533 disposed at the opened end of the tubular sleeve 511 to slidably engage with the sliding end portion 5312 of the control arm 531, wherein the resilient element 532 is disposed in the tubular sleeve 2311 at a position that two ends of the resilient element 532 are biased against the retaining stopper 533 and a stopper end 5313 of the control arm 531 such that when the first and second members 51, 52 are pulled away from each other to lengthen the control distance, the resilient element 532 is compressed between the retaining stopper 533 and the stopper end 5313 of the control arm 531.

It is worth to mention that the control arm 531 has a non-circular cross section to prevent the unwanted twisting movement between the shelter lenses 30. Accordingly, a plurality of guiding ridges are spacedly and radially protruded along the sliding end portion 5312 of the control arm 531 to slidably engage with guiding slots at an inner side of the retaining stopper 53. Therefore, the sliding end portion 5312 of the control arm 531 cannot be rotated within the retaining stopper 533 but can only slide through the retaining stopper 533.

The retractable arm 50 is extended between the shelter lenses 30 for aligning with the bridge 13 of the primary frame 10 when the shelter lenses 30 are held in front of the lenses 12 respectively. Therefore, when the shelter frame 20 is mounted in front of the primary frame 10, the bridge 13 is hidden behind the retractable arm 50 to enhance the aesthetic appearance of the shelter frame 20 with the primary frame 10.

Therefore, the retractable arms 50 of the shelter frame 20 of the present invention not only firmly attaches the shelter frame 20 in front of the primary frame 10 by the resilient element 532 compressing between the retaining stopper 533 and the stopper end 5313 of the control arm 531. It is important to point out that for the conventional spectacle, the attachment clipped closed by pushing together the center nosepiece such that the assembling area of the spectacle is very limited and hard to operate. Compared to all kinds of conventional primary spectacles frame, the shelter frame 20 of the present invention, the engaging force of the present embodiment can be applied to two lens holders 40 as opposed to the nosepiece itself, making it much easier to assemble and more secure.

Figure 4:
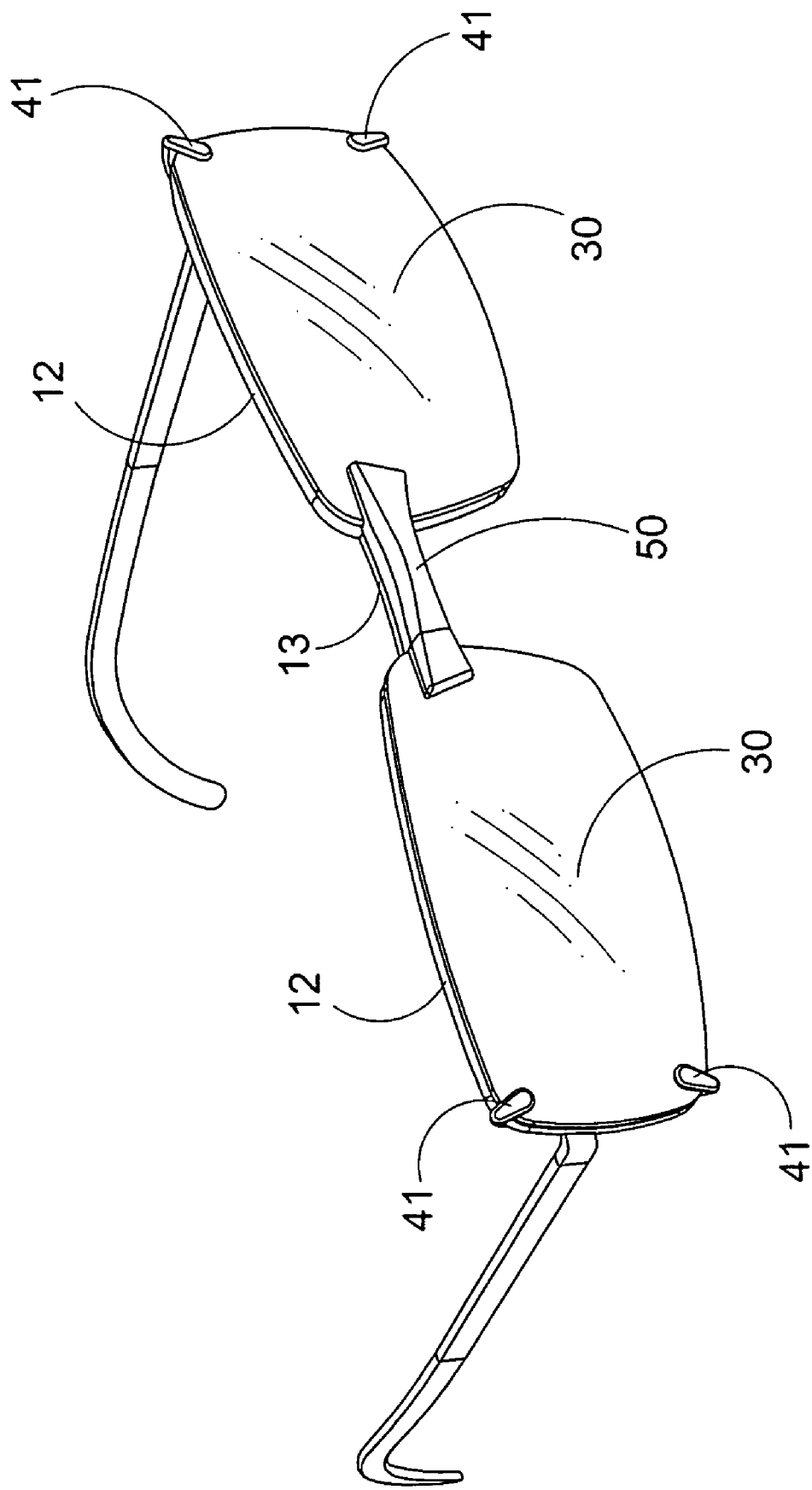
FIG. 4 is a perspective view of the shelter frame for the primary frame according to the above preferred embodiment of the present invention, illustrating the shelter frame being mounted in front of the primary frame.
Figure 5:
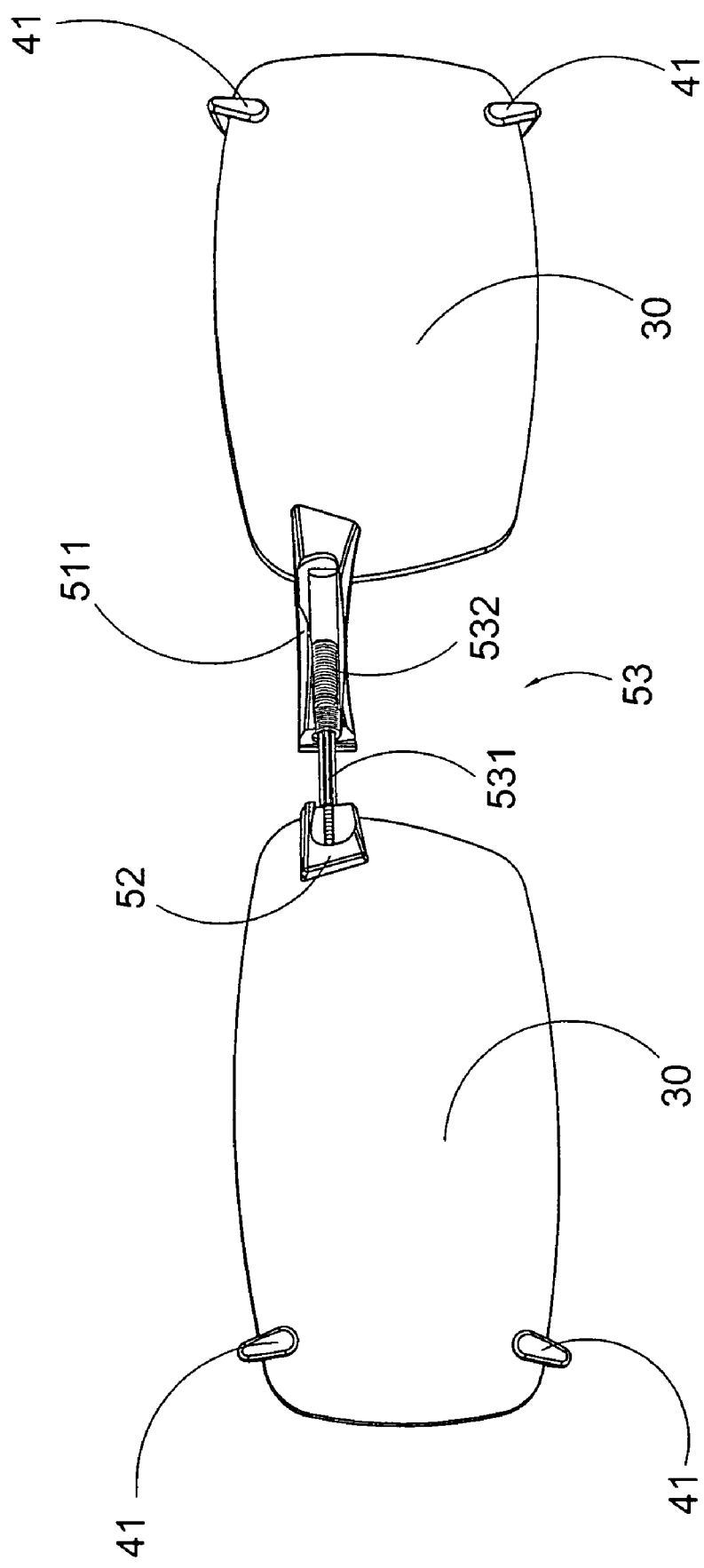
FIG. 5 is a perspective view of the shelter frame according to the above preferred embodiment of the present invention, illustrating the control distance of the shelter frame being increased.

According to the preferred embodiment, each of the lens holders 40 comprises two spaced apart engaging hooks 41 rearwardly extended from the outer side of the respective shelter lens 30 for engaging with the outer side of the respective lens 12 of the primary frame 10. As shown in FIGS. 1, 4 and 5, there are four engaging hooks 41 provided at the outer sides of the shelter lenses 30 respectively. In other words, the outer side of each of the shelter lenses 30 has two spaced apart engaging hooks 41. In particular, the two corresponding engaging hooks 41 are provided at the upper and lower edges of the respective shelter lens 30 at the outer side thereof. Therefore, when shelter frame 20 is mounted in front of the primary frame 10, the engaging hooks 41 are engaged with the four corner portions of the lenses 12 of the primary frame 10, such that the shelter frame 20 can be stably retained in position.

Figure 9:
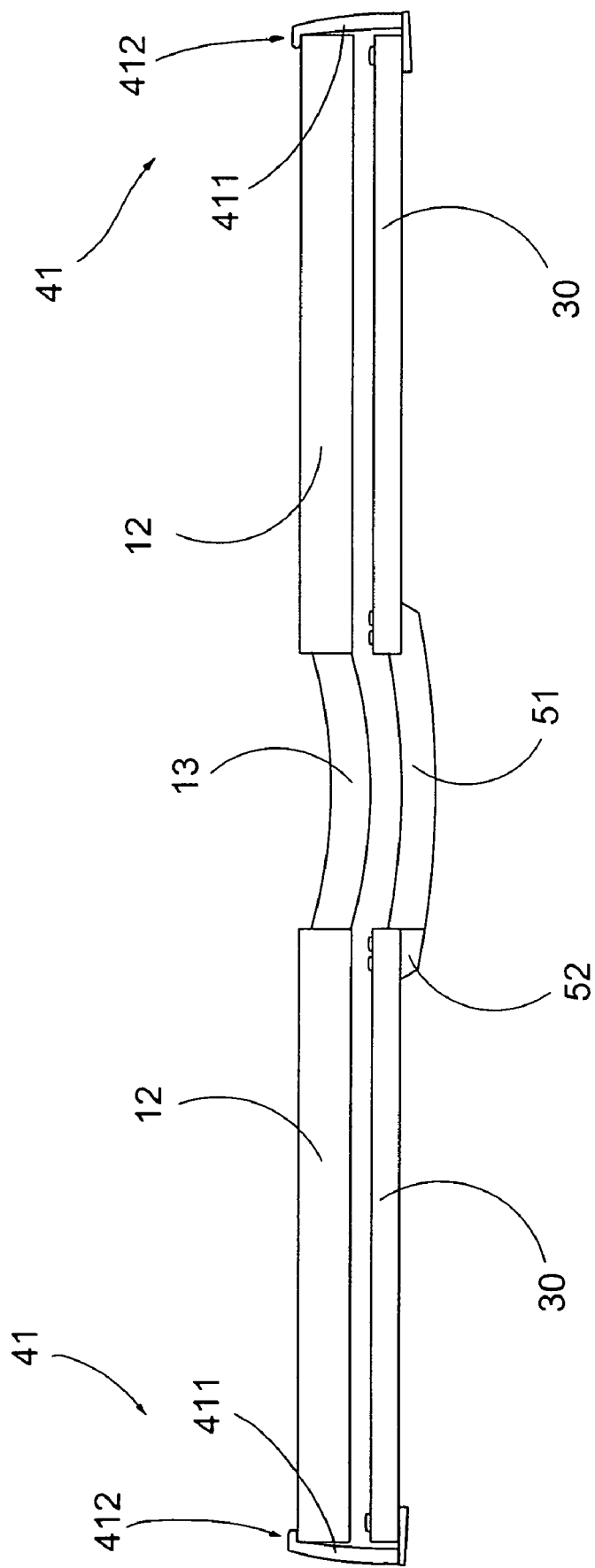
FIG. 9 is a top view of the shelter frame mounted in front of the primary frame according to the above preferred embodiment of the present invention, illustrating the lens holder engaging with the outer edge of the primary frame.

As shown in FIG. 9, each of the engaging hooks 41 has an elongated supporting arm 411 rearwardly extended from the outer side of the respective shelter lens 30 and an edge holder 412 integrally extended from a rear end of the supporting arm 411 for engaging with a peripheral edge of the respective lens 12 at the outer side thereof. It is worth to mention that each of the engaging hooks 41 is made of plastic materials and is made of non-scratching material so as to prevent the lens 12 from being scratched when the shelter frame 20 is mounted in front of the primary spectacles frame 10.

Figure 10:
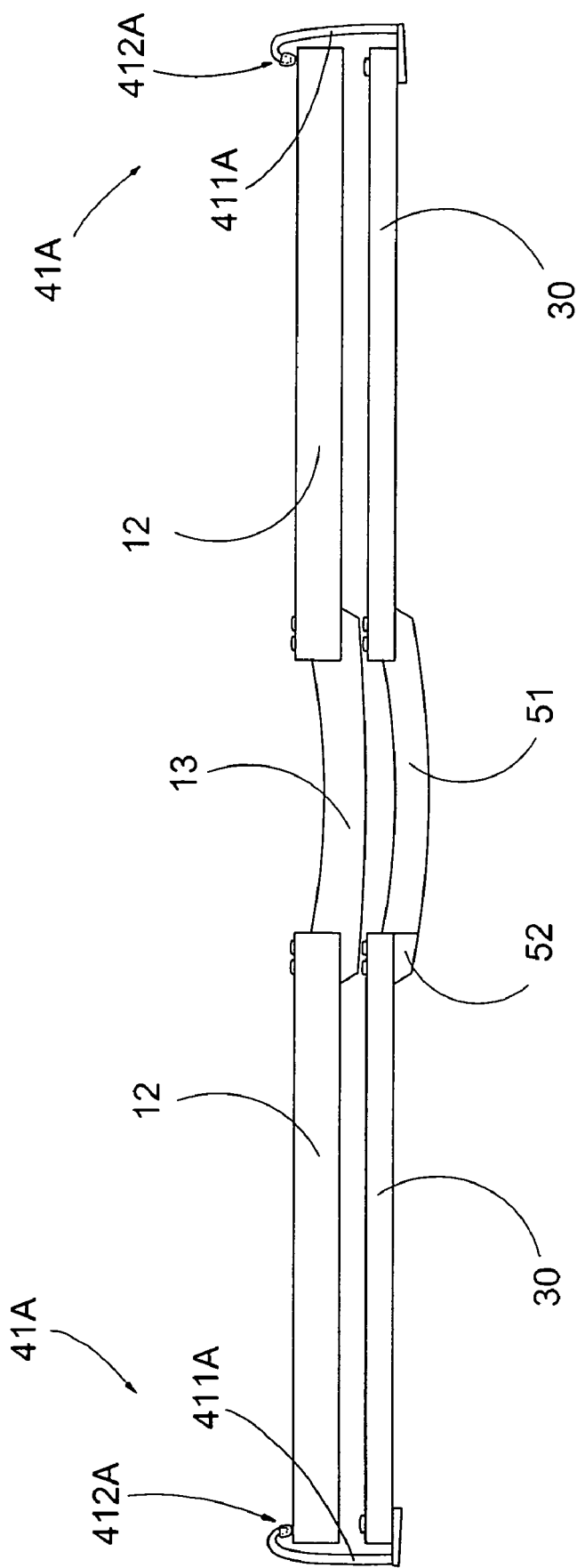
FIG. 10 illustrates an alternative mode of the lens holder according to the above preferred embodiment of the present invention, illustrating the lens holder engaging with the rear surfaces of the lenses of the primary frame.

Alternatively, each of the engaging hooks 41A has an elongated supporting arm 411A rearwardly extended from the outer side of the respective shelter lens 30 and a lens holder 412A integrally extended from a rear end of the supporting arm 411A for engaging with a rear surface of the respective lens 12 at the outer side thereof, as shown in FIG. 10. It is worth to mention that the engaging hook 41 and its alternative 41A can hold the shelter lenses 30 in front of the lenses 12 in a stably manner by maximizing the distance between two engaging hooks 41, 41A to match with the width of the primary frame 10. In addition, the primary frame 10 is embodied as a rimless spectacle frame.

Figure 2:
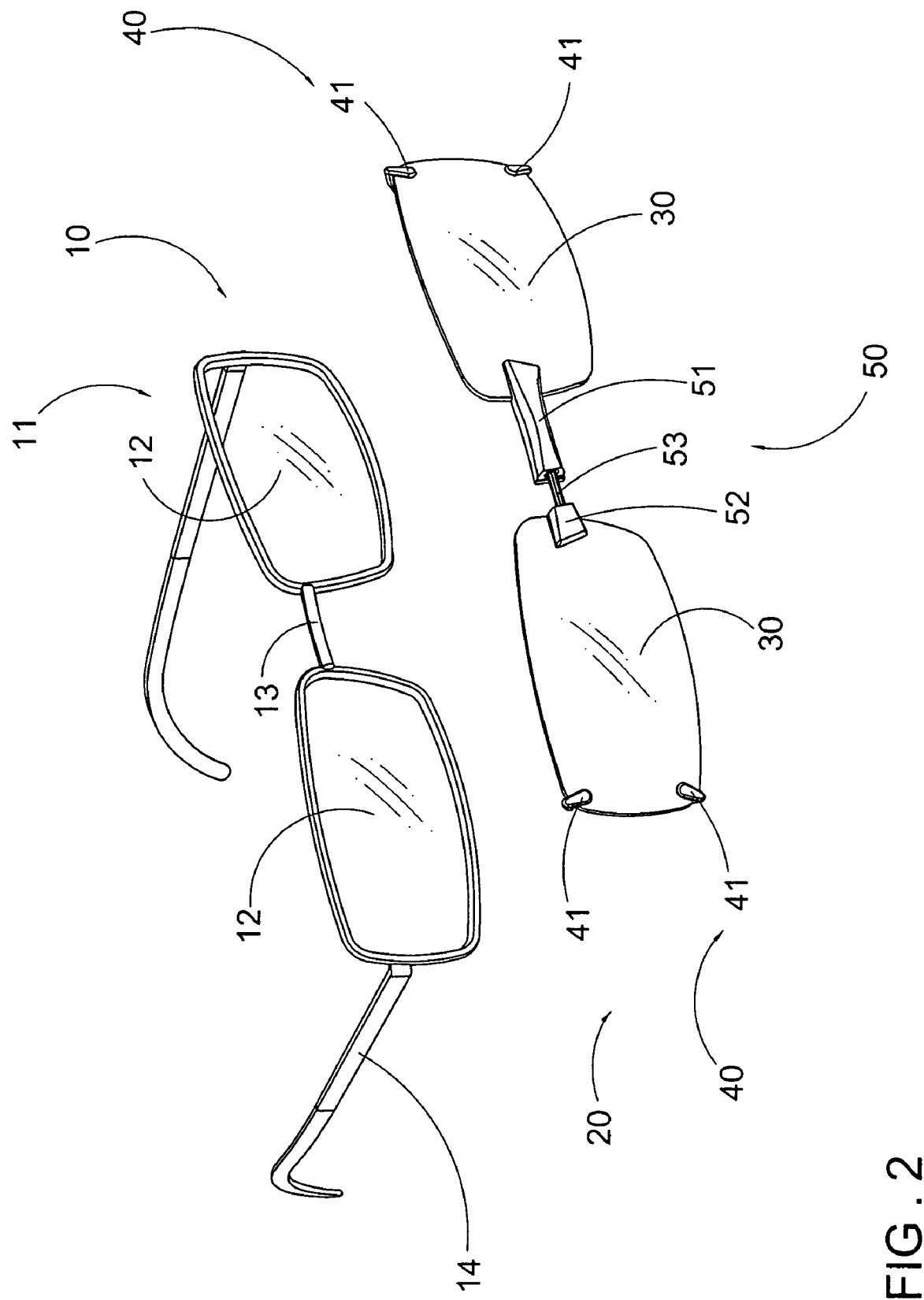
FIG. 2 is a perspective view of the shelter frame for the primary frame according to the above preferred embodiment of the present invention, illustrating the pulling force applied at the shelter frame.
Figure 3:
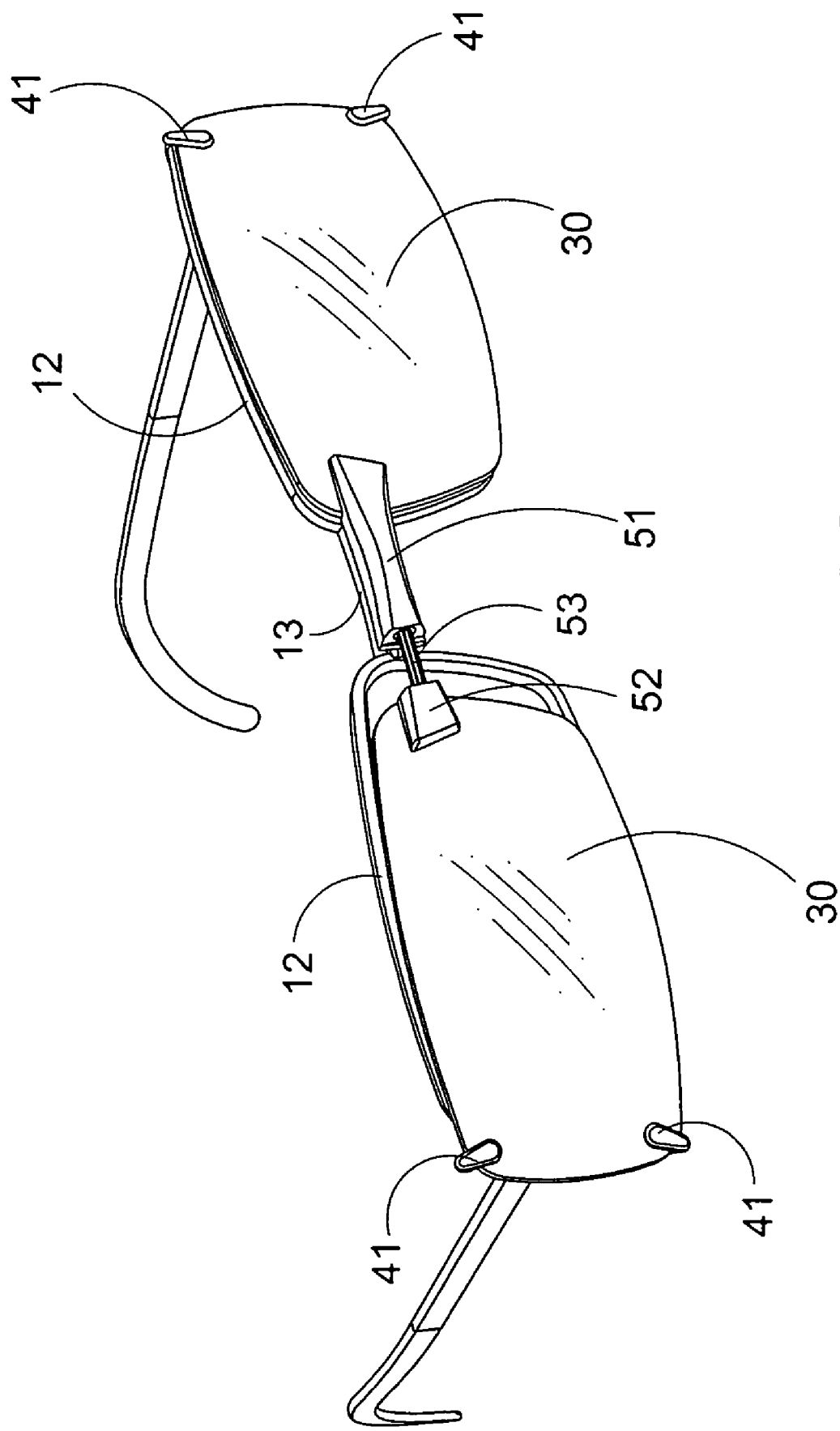
FIG. 3 is a perspective view of the shelter frame for the primary frame according to the above preferred embodiment of the present invention, illustrating the shelter frame being partially mounted in front of the primary frame.

In order to mount the shelter frame 20 in front of the primary frame 10, the user is able to apply a pulling force at one of the shelter lenses 30 to lengthen the control distance between the inner sides of the shelter lenses 30, which also lengthen the retractable arm 50, as shown in FIG. 2. Once the control distance is increased, the distance between the lens holders 40 are correspondingly increased. In other words, the distance between the lens holders 40 is larger than the distance between the two outer sides of the lenses 12 of the primary frame 10. Therefore, the user is able to engage one of the lens holders 40 to the corresponding outer side of the lens 12 of the primary frame 10 as shown in FIG. 3. Then, when the pulling force is released, the compressed resilient element 532 is returned back to its original form to reduce the control distance, as shown in FIG. 6. Therefore, another lens holder 40 is engaged with the corresponding outer side of another lens 12 of the primary frame 10 to hold the shelter lenses 30 in front of the lenses 12 of the primary frame 10 respectively, as shown in FIG. 4.

Figure 11:
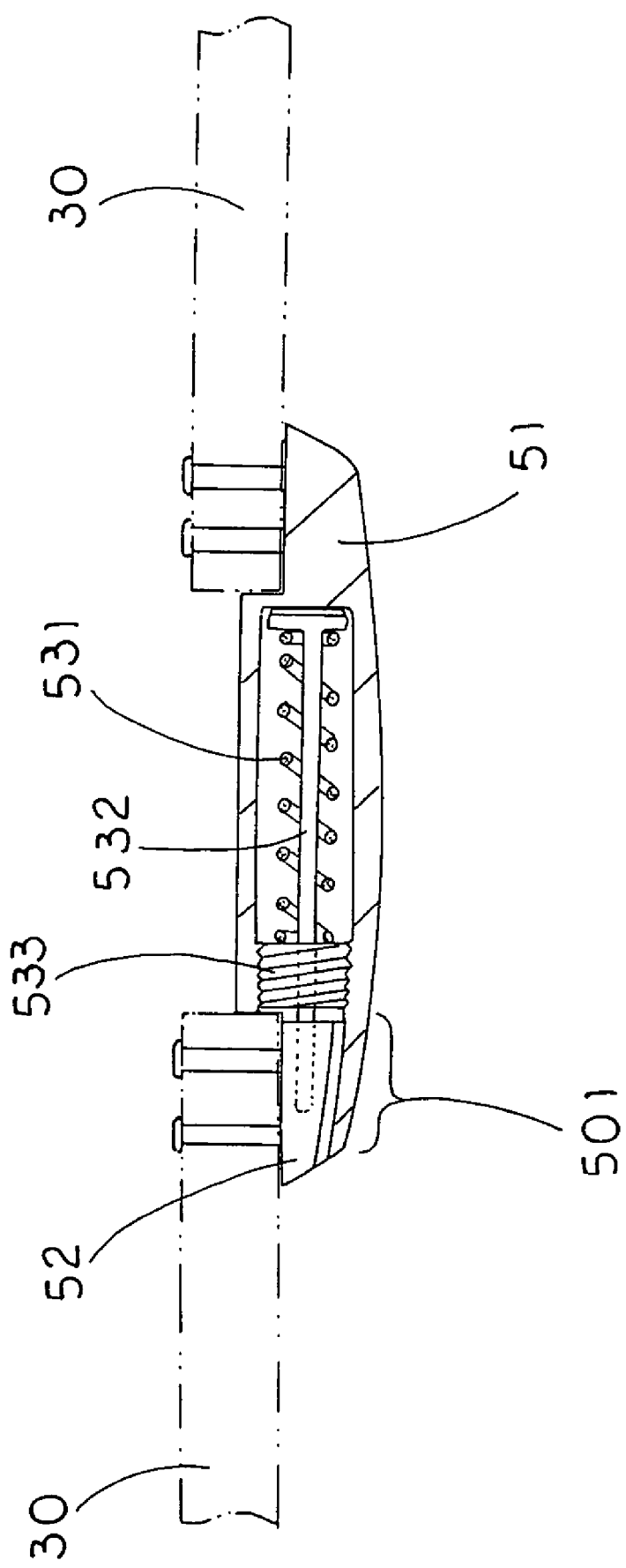
FIG. 11 illustrates an alternative mode of the retractable arm according to the above preferred embodiment of the present invention.
Figure 12:
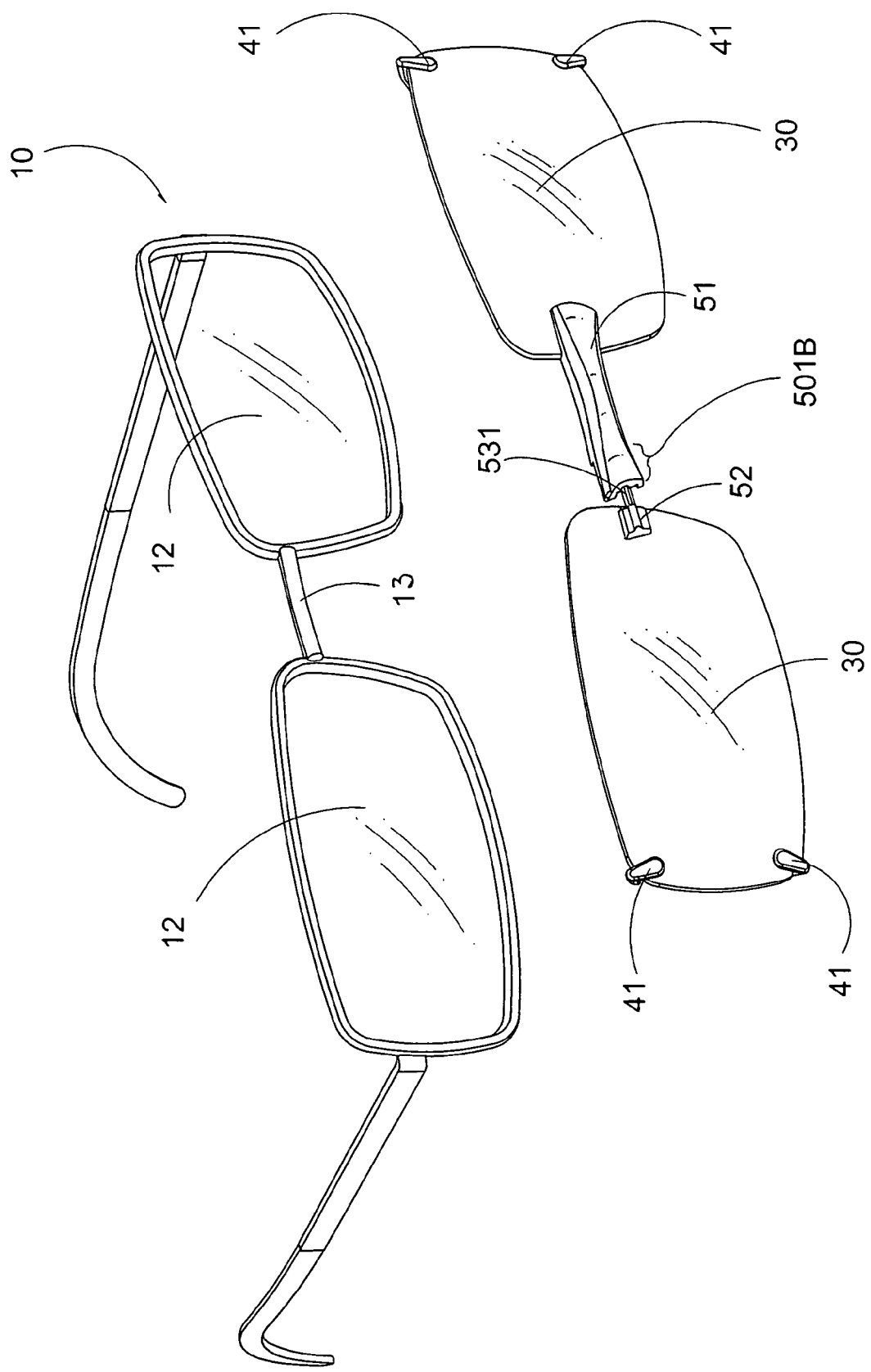
FIG. 12 is a perspective view of the alternative retractable arm according to the above preferred embodiment of the present invention, illustrating the second member being slid away from the front covering panel.
Figure 13:
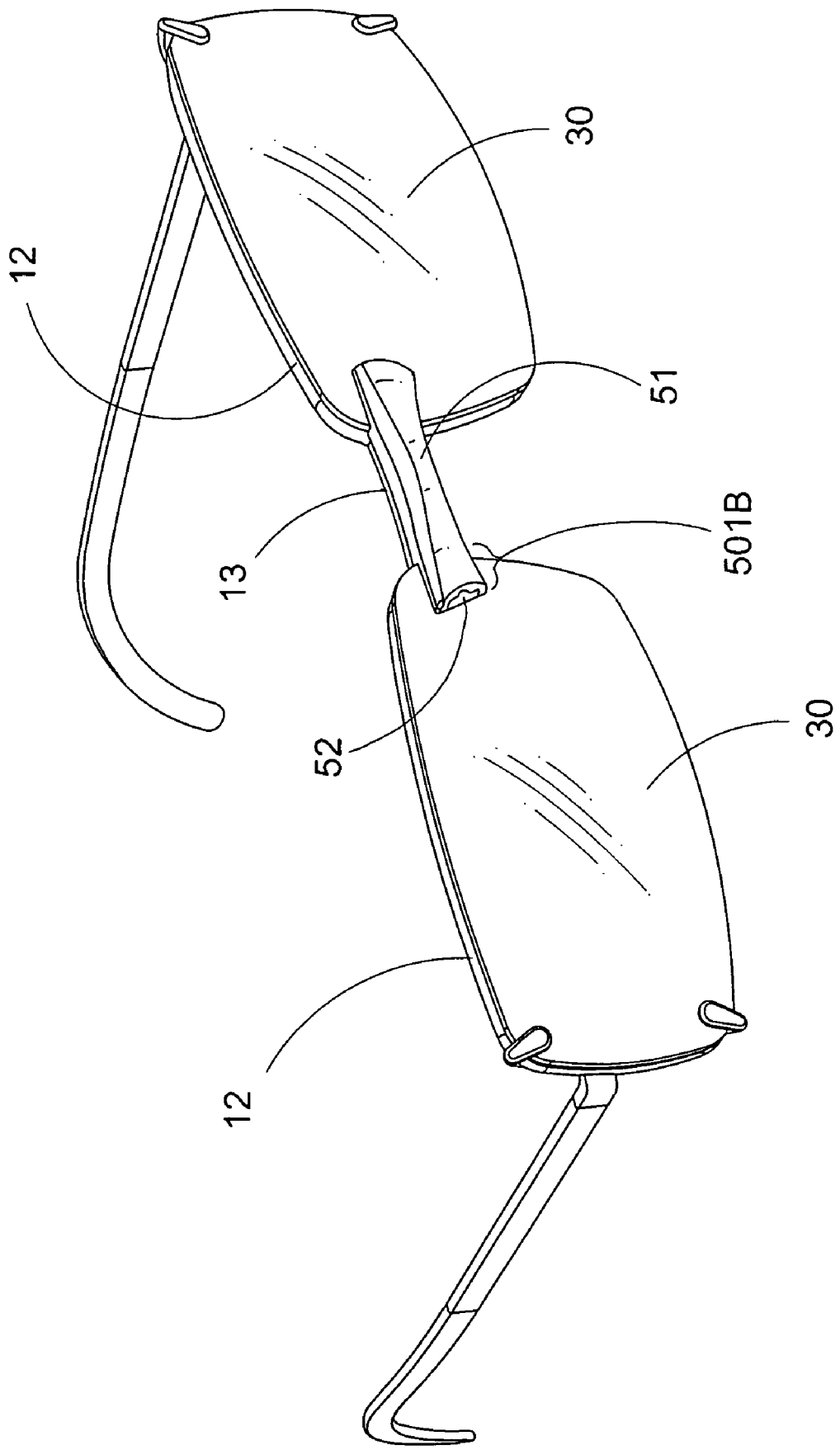
FIG. 13 is a perspective view of the alternative retractable arm according to the above preferred embodiment of the present invention, illustrating the second member being slid to hide behind the front covering panel.

FIGS. 11 to 13 illustrate an alternative mode of the retractable arm 50B which has the same structure of the above preferred embodiment. Accordingly, the retractable arm 50B has a one-piece frontal side extended between the inner sides of the shelter lenses 30 to enhance an appearance of the shelter frame 20. As shown in FIGS. 11 and 12, the first member 51 further comprises a front covering panel 501B sidewardly extended from the opened end of the tubular sleeve 511 to cover a front side of the second member 52 when the first and second members 51, 52 are coupled end-to-end.

As shown in FIGS. 11 and 12, when the shelter lenses 30 are pulled away from each other to lengthen the control distance, the front covering panel 501B is slid along the front side of the second member 52. Once the pulling force is released, the front covering panel 501B is slid back to cover the front side of the second member 52, as shown in FIG. 13. Therefore, the second member 52 is hidden behind the front covering panel 501B to form the frontal side of the retractable arm 50B. Preferably, the front covering panel 501B has a U-shaped cross section to receive the second member 52 within the front covering panel 501B to enhance the appearance of the shelter frame 20.

Figure 14:
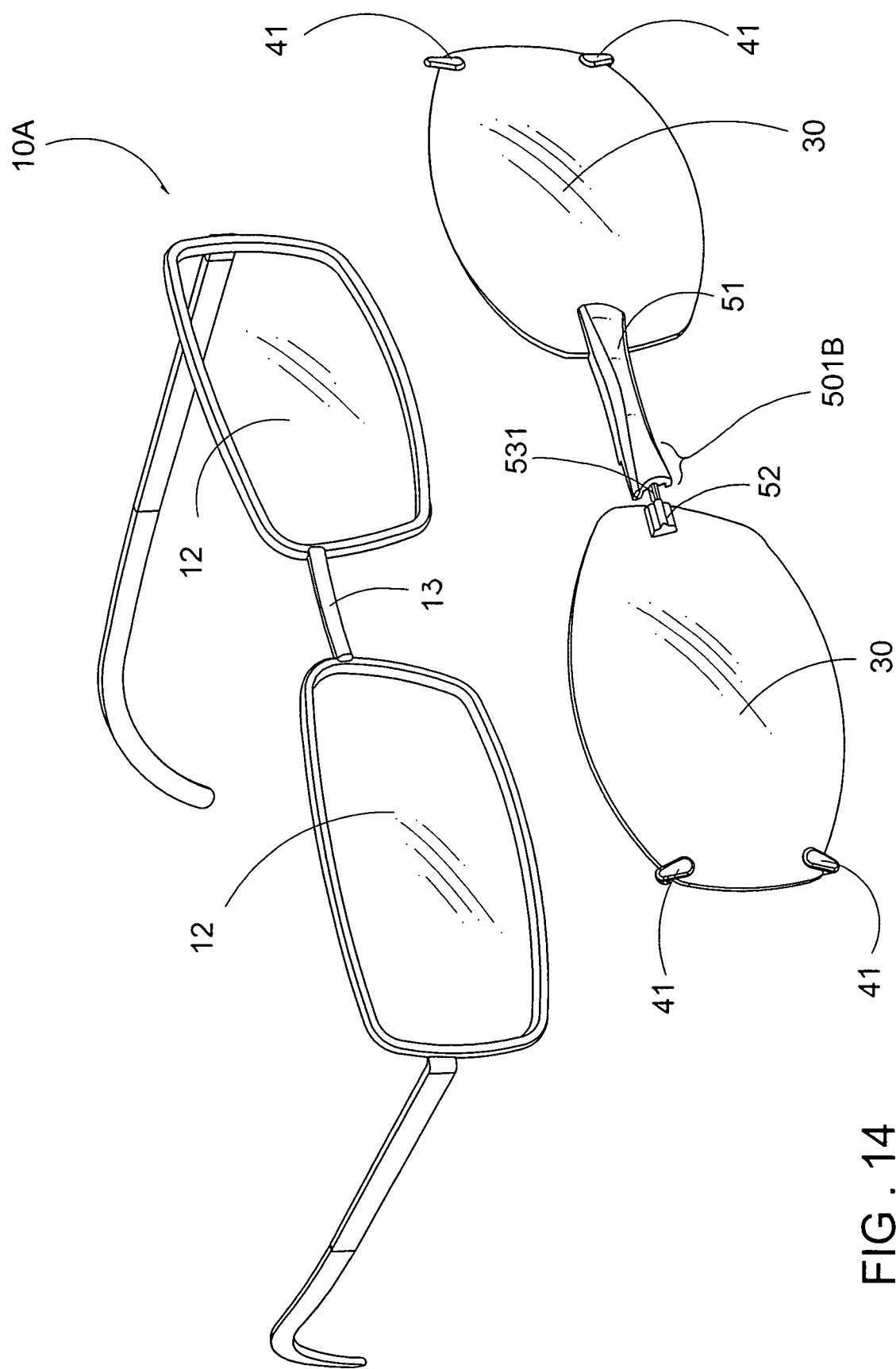
FIG. 14 is a perspective view of the shelter frame according to the above preferred embodiment of the present invention, illustrating the shelter frame incorporating with any shape of the primary frame.

FIG. 14 illustrates the shelter frame 20 of the present invention is adapted to incorporate with any shape of the primary frame 10A. According to the preferred embodiment, the configuration of each of the shelter lens 30 matches with the configuration of the corresponding lens 12 such that the shelter lenses 30 are fittingly cover at the front side of the lenses 12 respectively. However, the retractable arm 50 provides the retractable force between the shelter lenses 30 to securely retain the shelter frame 20 in front of the primary frame 10A even through the width of the shelter frame 20 is different from the width of primary frame 10A as shown in FIG. 14.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A shelter frame for detachably mounting in front of a primary frame which comprises two lenses and a bridge extending between said lenses, wherein said shelter frame comprises:

two spaced apart shelter lenses defining a control distance between two inner sides of said shelter lenses;

two lens holders provided at two outer sides of said shelter lenses respectively; and a retractable arm extended between said two inner sides of said shelter lenses for applying a retractable force therebetween to adjust said control distance, wherein when said shelter lenses are pulled away from each other to lengthen said retractable arm for extending said control distance, said lens holders are adapted for engaging with two outer sides of said lenses of said primary frame, such that when said retractable arm is retracted via said retractable force, said shelter lenses are adapted for holding in front of said lenses respectively, wherein said retractable arm comprises a first member mounted to said inner side of one of said shelter lenses, a second member mounted to said inner side of another said shelter lens, and a retraction unit coupling between said first and second members such that said shelter lenses are adapted to be pulled away from each other to extend said control distance, wherein said retraction unit comprises an elongated control arm having an affixing end portion affixed to said second member and a sliding end portion slidably coupled with said first member, and a resilient element coupling with said sliding end portion of said control arm for applying said retractable force against said first member to pull said first member towards said second member, wherein said first member comprises a tubular sleeve having a closed end mounting to said inner side of said respective shelter lens and an opened end extended towards said inner side of another said shelter lens, wherein said sliding end portion of said control arm is slidably received in said tubular sleeve to slidably engage said second member with said first member, wherein said first member further comprises a front covering panel sidewardly extended from said opened end of said tubular sleeve to cover a front side of said second member when said first and second members are coupled end-to-end.

2. A shelter frame for detachably mounting in front of a primary frame which comprises two lenses and a bridge extending between said lenses, wherein said shelter frame comprises:

two spaced apart shelter lenses defining a control distance between two inner sides of said shelter lenses;

two lens holders provided at two outer sides of said shelter lenses respectively; and a retractable arm extended between said two inner sides of said shelter lenses for applying a retractable force therebetween to adjust said control distance, wherein when said shelter lenses are pulled away from each other to lengthen said retractable arm for extending said control distance, said lens holders are adapted for engaging with two outer sides of said lenses of said primary frame, such that when said retractable arm is retracted via said retractable force, said shelter lenses are adapted for holding in front of said lenses respectively, wherein said retractable arm comprises a first member mounted to said inner side of one of said shelter lenses, a second member mounted to said inner side of another said shelter lens, and a retraction unit coupling between said first and second members such that said shelter lenses are adapted to be pulled away from each other to extend said control distance, wherein said retraction unit comprises an elongated control arm having an affixing end portion affixed to said second member and a sliding end portion slidably coupled with said first member, and a resilient element coupling with said sliding end portion of said control arm for applying said retractable force against said first member to pull said first member towards said second member, wherein said first member comprises a tubular sleeve having a closed end mounting to said inner side of said respective shelter lens and an opened end extended towards said inner side of another said shelter lens, wherein said sliding end portion of said control arm is slidably received in said tubular sleeve to slidably engage said second member with said first member, wherein said resilient element comprises a compression spring coaxially mounted at said sliding end portion of said control arm for applying said retractable force against said second member when said second member is pulled away from said first member, wherein said first member further comprises a front covering panel sidewardly extended from said opened end of said tubular sleeve to cover a front side of said second member when said first and second members are coupled end-to-end.

3. A shelter frame for detachably mounting in front of a primary frame which comprises two lenses and a bridge extending between said lenses, wherein said shelter frame comprises:

two spaced apart shelter lenses defining a control distance between two inner sides of said shelter lenses;

two lens holders provided at two outer sides of said shelter lenses respectively; and a retractable arm extended between said two inner sides of said shelter lenses for applying a retractable force therebetween to adjust said control distance, wherein when said shelter lenses are pulled away from each other to lengthen said retractable arm for extending said control distance, said lens holders are adapted for engaging with two outer sides of said lenses of said primary frame, such that when said retractable arm is retracted via said retractable force, said shelter lenses are adapted for holding in front of said lenses respectively, wherein said retractable arm comprises a first member mounted to said inner side of one of said shelter lenses, a second member mounted to said inner side of another said shelter lens, and a retraction unit coupling between said first and second members such that said shelter lenses are adapted to be pulled away from each other to extend said control distance, wherein said retraction unit comprises an elongated control arm having an affixing end portion affixed to said second member and a sliding end portion slidably coupled with said first member, and a resilient element coupling with said sliding end portion of said control arm for applying said retractable force against said first member to pull said first member towards said second member, wherein said first member comprises a tubular sleeve having a closed end mounting to said inner side of said respective shelter lens and an opened end extended towards said inner side of another said shelter lens, wherein said sliding end portion of said control arm is slidably received in said tubular sleeve to slidably engage said second member with said first member, wherein said resilient element comprises a compression spring coaxially mounted at said sliding end portion of said control arm for applying said retractable force against said second member when said second member is pulled away from said first member, wherein said retraction unit further comprises a retaining stopper disposed at said opened end of said tubular sleeve to slidably engage with said control arm, wherein said resilient element is disposed in said tubular sleeve at a position that two ends of said resilient element are biased against said retaining stopper and a stopper end of said control arm such that said when said first and second members are pulled away from each other to lengthen said control distance, said resilient element is compressed between said retaining stopper and said stopper end of said control arm, wherein said first member further comprises a front covering panel sidewardly extended from said opened end of said tubular sleeve to cover a front side of said second member when said first and second members are coupled end-to-end.

4. The shelter frame, as recited in claim 3, wherein said retractable arm is extended between said shelter lenses for aligning with said bridge of said primary frame when said shelter lenses are held in front of said lenses respectively.

5. The shelter frame, as recited in claim 3, wherein each of said lens holders comprises two spaced apart engaging hooks rearwardly extended from said outer side of said respective shelter lens for engaging with said outer side of said respective lens of said primary frame.

6. The shelter frame, as recited in claim 5, wherein each of said engaging hooks has an elongated supporting arm rearwardly extended from said outer side of said respective shelter lens and an edge holder integrally extended from a rear end of said supporting arm for engaging with a peripheral edge of said respective lens at said outer side thereof.

7. The shelter frame, as recited in claim 5, wherein each of said engaging hooks has an elongated supporting arm rearwardly extended from said outer side of said respective shelter lens and a lens holder integrally extended from a rear end of said supporting arm for engaging with a rear surface of said respective lens at said outer side thereof.

* * * * *